United States Patent
Chen et al.

(10) Patent No.: US 11,943,710 B2
(45) Date of Patent: Mar. 26, 2024

(54) ELECTRONIC DEVICE, METHOD, MEDIUM AND APPARATUS FOR MANAGING EXTENDER NODES

(71) Applicant: ARRIS Enterprises LLC, Suwanee, GA (US)

(72) Inventors: Lidan Chen, Shenzhen (CN); Ruilu Zeng, Shenzhen (CN); Ju Li, Shenzhen (CN); Bo Chen, Shenzhen (CN); Yu Zhang, Guangdong (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/470,194

(22) Filed: Sep. 9, 2021

(65) Prior Publication Data
US 2022/0116868 A1  Apr. 14, 2022

(30) Foreign Application Priority Data
Oct. 9, 2020 (CN) .......................... 202011073044.9

(51) Int. Cl.
*H04W 52/02* (2009.01)
*H04W 16/26* (2009.01)

(52) U.S. Cl.
CPC ....... *H04W 52/0206* (2013.01); *H04W 16/26* (2013.01); *H04W 52/0216* (2013.01);
(Continued)

(58) Field of Classification Search
CPC ............. H04W 52/0206; H04W 16/26; H04W 52/0216; H04W 52/0219; H04W 52/0229;
(Continued)

(56) References Cited

U.S. PATENT DOCUMENTS 9,271,233 B2 * 2/2016 Miura ................... H04L 12/12
11,412,471 B2 * 8/2022 Tarighat Mehrabani ...................
H04W 56/0015
(Continued)

OTHER PUBLICATIONS

International Search Report and the Written Opinion of the International Searching Authority dated Jan. 5, 2022 in International (PCT) Application No. PCT/US2021/049581.
(Continued)

*Primary Examiner* — Omer S Mian
(74) *Attorney, Agent, or Firm* — Wenderoth, Lind & Ponack, L.L.P.

(57) ABSTRACT

An electronic device for managing gateways comprises: a processor; and a computer-readable storage medium which contains executable instructions which, when executed by the processor, causes the electronic device to: determine whether the current time falls within the specified sleep time interval; in response to determining that the current time falls within the specified sleep time interval, determine whether the first extender node among one or a plurality of extender nodes is in an idle connection state, wherein the idle connection state includes: the first extender node being not connected to any client, or the first extender node being only connected to a sleeping client; and sending a sleep command to the first extender node based at least in part on the idle connection state of the first extender node, wherein the sleep command instructs the first extender node to power off a wireless network interface of the first extender node.

17 Claims, 5 Drawing Sheets

(52) U.S. Cl.
CPC ... *H04W 52/0219* (2013.01); *H04W 52/0229* (2013.01); *H04W 52/0235* (2013.01); *H04W 52/0274* (2013.01)

(58) Field of Classification Search
CPC .......... H04W 52/0235; H04W 52/0274; Y02D 30/70
See application file for complete search history.

(56) References Cited

U.S. PATENT DOCUMENTS

| | | | |
|---|---|---|---|
| 2013/0021932 A1* | 1/2013 | Damnjanovic ... | H04W 52/0209 370/252 |
| 2014/0051419 A1* | 2/2014 | Brend ............... | H04W 52/0206 455/418 |
| 2014/0193150 A1* | 7/2014 | Mukai .................... | H04L 12/44 398/67 |

OTHER PUBLICATIONS

International Preliminary Report on Patentability and Written Opinion dated Apr. 20, 2023 in International Application No. PCT/US2021/049581.

\* cited by examiner

ELECTRONIC DEVICE, METHOD, MEDIUM AND APPARATUS FOR MANAGING EXTENDER NODES

TECHNICAL FIELD

The present disclosure relates to managing extender nodes in networks, and particularly relates to an electronic device, a method, a medium and an apparatus for managing extender nodes.

BACKGROUND ART

In the existing wireless communication network, the clients used by the users can connect to the wireless access points in the wireless communication network through wireless links. However, the coverage of the main access point of a wireless communication network is usually limited. One or a plurality of extender nodes can be used to expand the coverage of the main access point. Each extender node may be arranged in a corresponding area far from the main access point and connected to the main access point. The extender node can act as a wireless access point in the corresponding area, thereby providing the wireless communication network for clients far away from the main access point. A wireless network interface of extender node usually keeps uninterrupted power-on state. Therefore, wireless communication networks with a plurality of extender nodes usually consume more power.

SUMMARY OF THE INVENTION

The present disclosure relates to managing extender nodes in a wireless communication network. Specifically, the present disclosure aims to reduce the power consumption of the extender nodes without significantly affecting the performance of the network.

Some aspects of the present disclosure involve an electronic device that provides a wireless communication network to clients via one or a plurality of extender nodes in a network, wherein the electronic device includes a processor and a computer-readable storage medium. The computer-readable storage medium contains executable instructions that, when executed by the processor, cause the electronic device to be configured to: determine whether the current time falls within the specified sleep time interval; in response to determining that the current time falls within the specified sleep time interval, determine whether the first extender node among the one or a plurality of extender nodes is in an idle connection state, wherein the idle connection state includes: (i) the first extender node being not connected to any client, or (ii) the first extender node being only connected to sleeping clients; and sending a sleep command to the first extender node based, at least in part, on the idle connection state of the first extender node, wherein the sleep command instructs the first extender node to power off a wireless network interface for the wireless communication network of the first extender node.

In some embodiments, the electronic device is configured to: identify a client as a sleeping client in response to determining that the traffic of the client within a specified time length is lower than a predetermined threshold.

In some embodiments, the electronic device is configured to: identify the type of the client; and determine at least one of the predetermined threshold and the specified time length for the client based on the identified type.

In some embodiments, the electronic device is connected to the first extender node through a wired link, wherein the electronic device is further configured to: in response to the expiration of the specified sleep time interval, send a wake-up command to the first extender node through the wired link to wake up the first extender node.

In some embodiments, the electronic device is connected to the first extender node through a wireless link, wherein the sleep command sent by the electronic device further instructs the first extender node to start a timer so that the first extender node wakes up autonomously when the timer expires.

In some embodiments, the wake-up includes restoring the wireless link between the first extender node and the electronic device based on the wireless link information saved by the first extender node.

In some embodiments, the first extender node is configured to wake up autonomously in response to a user's physical operation on the first extender node.

In some embodiments, the wake-up of the first extender node includes powering on the wireless network interface of the first extender node again.

In some embodiments, the electronic device is further configured to: transmit a sleep command to each of the one or a plurality of extender nodes in response to determining that the electronic device is about to enter a sleep state.

Another aspect of the present disclosure relates to a method for managing one or a plurality of extender nodes in a network, wherein the electronic device of the network provide a wireless communication network to clients via the one or a plurality of extender nodes, and the method comprises: determining whether the current time falls within the specified sleep time interval; in response to determining that the current time falls within the specified sleep time interval, determining whether the first extender node among the one or a plurality of extender nodes is in an idle connection state, wherein the idle connection state includes: (i) the first extender node being not connected to any client, or (ii) the first extender node being only connected to sleeping clients; and in response to determining that the first extender node is in the idle connection state, sending a sleep command to the first extender node, wherein the sleep command instructs the first extender node to power off the wireless network interface for the wireless communication network of the first extender node.

Another aspect of the present disclosure relates to a computer-readable storage medium containing executable instructions that, when executed by a processor, cause the processor to perform any of the methods described in the present disclosure.

Another aspect of the present disclosure relates to an apparatus comprising components for performing any of the methods described in the present disclosure.

BRIEF DESCRIPTION OF THE DRAWINGS

For a better understanding of the present disclosure and to show how to implement the present disclosure, examples will be herein described with reference to the Attached Drawings, wherein.

It should be noted that throughout the drawings, similar reference numerals and signs refer to corresponding parts. In addition, multiple instances of the same part are designated by a common prefix separated from the instance number by a dash.

DESCRIPTION OF EMBODIMENTS

The following detailed description is made with reference to the Attached Drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is limited by the attached claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

As described above, in order to provide a wireless communication network to clients, the wireless network interface of the extender node in the wireless communication network is always powered on uninterruptedly. Therefore, wireless communication networks with a plurality of extender nodes usually consume more power. According to an embodiment of the present disclosure, the main access point can be used to monitor the status of each extender node and instruct the extender node to power off its wireless network interface when it satisfies the sleep condition, thereby reducing power consumption. In addition, the sleeping extender node may wake up in response to the wake-up condition. Sleep and wake-up of extender nodes can be automatically executed without being perceived by users, so it will not significantly affect the performance of the network.

Figure 1:
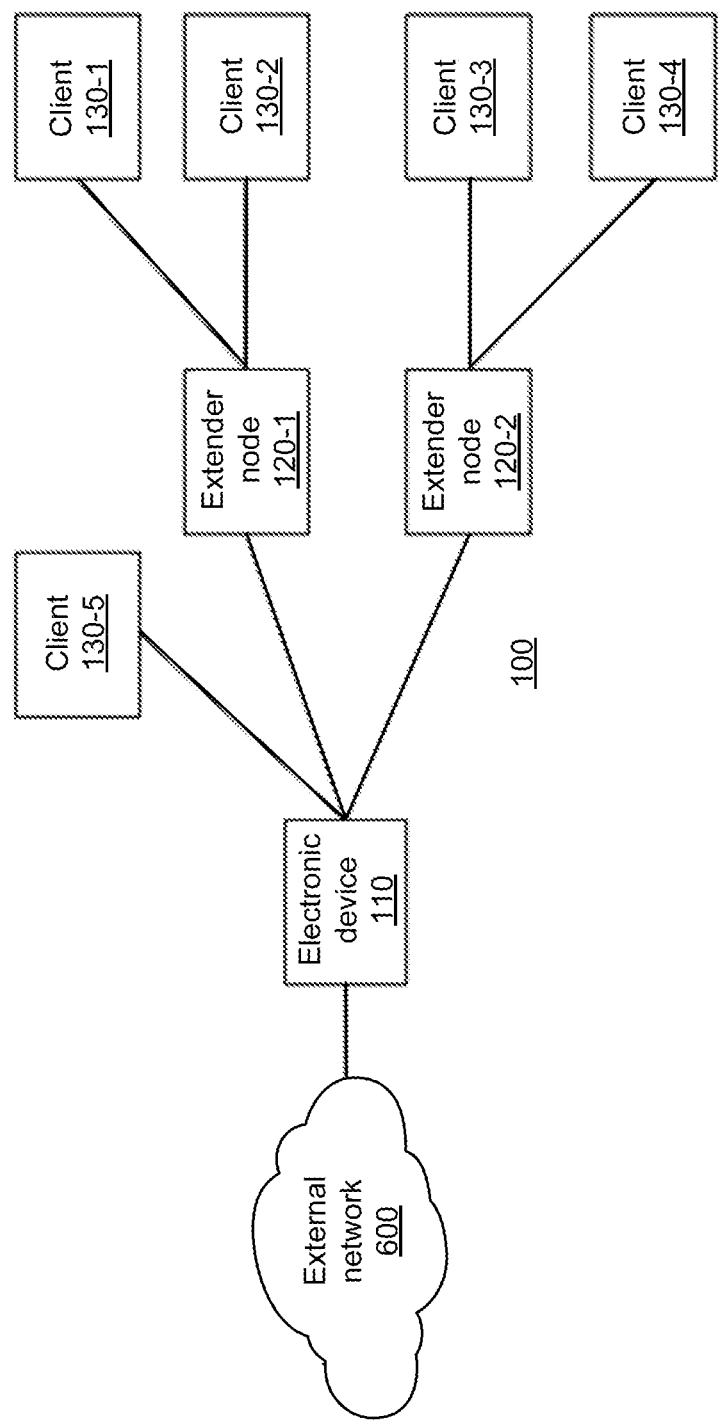
FIG. 1 shows an exemplary block diagram of a network system according to an embodiment of the present disclosure.

FIG. 1 shows an exemplary block diagram of a network system 100 according to an embodiment of the present disclosure, in which various technologies according to an embodiment of the present disclosure is implemented. The network system 100 may be implemented as a home network, an office network, a factory network, or any other type of network.

As shown in FIG. 1, the network system 100 may include an electronic device 110, one or a plurality of extender nodes 120, and one or a plurality of clients 130. The electronic device 110 may connect the network system 100 to the external network 600. The extender node 120-1 can be connected to the electronic device 110 and connected to the clients 130-1 and 130-2. The extender node 120-2 can be connected to the electronic device 110 and connected to the clients 130-3 and 130-4. Additionally, the client 130-5 may be directly connected to the electronic device 110. The clients 130-1 to 130-5 can exchange data with the external network 600 through the network system 100 to obtain various services.

According to an embodiment of the present disclosure, the electronic device 110 may act as or operate with the main access point of the network system 100. The main access point may be various types of electronic devices capable of transmitting communication between the network system 100 and the external network 600. In other words, each device in the network system 100 can access the external network 600 through the electronic device 110. The external network 600 may include various types of networks, such as a wide area network (WAN), a local area network (LAN), a wireless network, a mobile network, an optical fiber, the internet, and the like. Note that the present disclosure does not specifically limit the type of the external network 600. The electronic device 110 can be implemented as, e.g., an access point, a gateway (such as Touchstone® TG3452 gateway), a router (such as a wireless router and a mobile hotspot router), and a home network controller, or as a part of them.

The electronic device 110 may have one or a plurality of wireless network interface (not shown), such as one or a plurality of Wi-Fi interfaces. These wireless network interfaces allow wireless links to be established between other devices in the network system 100 (e.g., the extender node 120 and/or the client 130) and the electronic device 110. Additionally or alternatively, the electronic device 110 may also have a wired interface (e.g., an Ethernet interface, not shown), thereby allowing a wired link to be established between other devices (e.g., the extender node 120) in the network system 100 and the electronic device 110.

According to an embodiment of the present disclosure, the electronic device 110 may be connected to one or a plurality of extender nodes 120. The extender node 120 can be used to expand the coverage of the wireless communication network provided by the electronic device 110. Each extender node 120 may be arranged in a corresponding area away from the electronic device 110 and serve as a wireless access point in the corresponding area. The extender node 120 can bridge the client 130 and the electronic device 110. In other words, the extender node 120 can act as a relay between the client 130 and the electronic device 110. Accordingly, the client 130 can be connected to the extender node 120 and use the wireless communication network provided by the extender node 120 as if the client 130 were connected to the electronic device 110.

Each extender node 120 may have a one or a plurality of wireless network interface (not shown), such as one or a plurality of Wi-Fi interfaces. These wireless network interfaces allow wireless links to be established between other devices (e.g., the electronic device 110 and/or the client 130) in the network system 100 and the extender node 120. Additionally, the extender node 120 may also have a wired interface (e.g., an Ethernet interface, not shown), thereby allowing a wired link to be established between other devices (e.g., the electronic device 110) in the network system 100 and the extender node 120.

According to an embodiment of the present disclosure, the link between the electronic device 110 and the extender node 120 may be a wired link or a wireless link. As an example of a wired link, the extender node 120 may be connected to the electronic device 110 through an Ethernet backhaul or a MoCA (Multimedia over Coax Alliance) backhaul. As an example of a wireless link, the extender node 120 may be connected to the electronic device 110 through a Wi-Fi backhaul. Compared with wired links, wireless links have higher flexibility. However, the wireless link depends on the wireless network interface of the extender node 120 to work normally. If the wireless network interface of the extender node 120 is powered off, the wireless link between the extender node 120 and the electronic device 110 will be interrupted.

According to embodiments of the present disclosure, the extender node 120 may be implemented as various types of electronic devices. For example, an electronic device (e.g., a router) similar to the electronic device 110 may be utilized as the extender node 120. In this case, the extender node 120 is different from the electronic device 110 in that the electronic device 110 is configured to act as a primary access point connecting the network system 100 with the external network 600, while the extender node 120 is configured to act as a secondary access point inside the network system 100. Alternatively, the extender node 120 may be implemented with a simpler device than the electronic device 110. For example, the extender node 120 may not have an interface adapted to the external network 600, but only retain an interface adapted to the electronic device 110 and the client 130. The extender node 120 as a secondary access point is not responsible for functions associated with the primary access point, such as IP allocation, maintaining network topology information, managing and monitoring the extender nodes, and so on.

According to an embodiment of the present disclosure, each client 130 can be connected to the extender node 120 or the electronic device 110 through a wireless link, so that various services provided by the network operator through the external network 600 can be accessed. These services include but are not limited to data services, telephone or voice services, and multimedia services. The client 130 may be disconnected from the extender node 120 or the electronic device 110 and connected to another extender node 120. The client 130 can be various types of devices, including but not limited to personal computers, smart phones, tablet computing devices, wearable devices, smart home devices, smart office devices, smart production devices, and so on.

According to an embodiment of the present disclosure, the wireless communication network provided by the electronic device 110 along with the extender nodes 120 could be a wireless communication network that supports any of Wi-Fi, Bluetooth, Bluetooth Low Energy (BLE), RF4CE, ZigBee, Z-Wave, IEEE 802.15.4, MQTT (Message Queue Telemetry Transport), DDS (Data Distribution Service), AMQP (Advanced Message Queuing Protocol), or other short range protocols. Also, the wireless links between the electronic device 110, the extender node 120 and/or the client 130 may be of a respective type that corresponds to the wireless communication network. The wireless network interface of any of the electronic device 110, the extender node 120 and/or the client 130 may be a wireless network interface that is used for the wireless link of the respective type.

It should be noted that the number of each element shown in FIG. 1 is only schematic. According to other embodiments of the present disclosure, the network system 100 may include more or fewer elements without limitation. For example, the network system 100 may include more extender nodes 120. Each extender node 120 can be connected to more or fewer clients 130. Some extender nodes 120 may not be connected to any clients 130.

Figure 2:
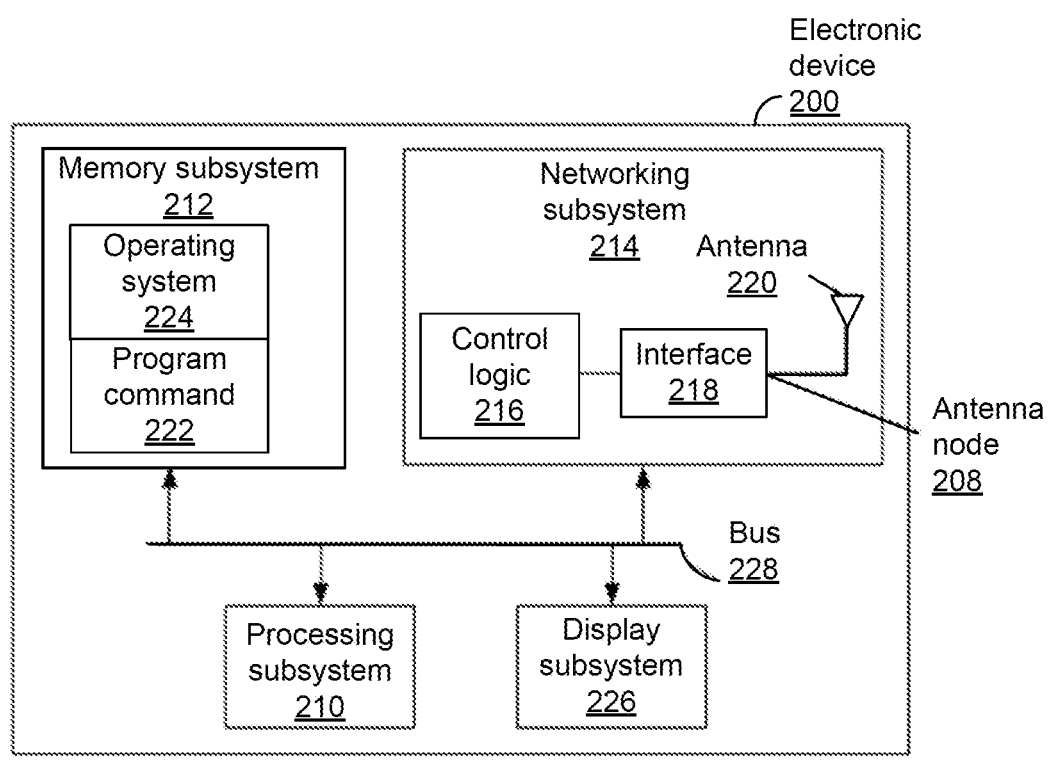
FIG. 2 shows an exemplary block diagram of an electronic device according to an embodiment of the present disclosure.

FIG. 2 shows an exemplary block diagram of an electronic device 200 according to an embodiment of the present disclosure. The electronic device 200 can be used as the electronic device 110 or the extender node 120 described in FIG. 1.

As shown in FIG. 2, the electronic device 200 includes a processing subsystem 210, a memory subsystem 212, and a networking subsystem 214. The processing subsystem 210 comprises one or a plurality of devices configured to perform computing operations. The processing subsystem 210 performs any of the methods described in the present disclosure. For example, the processing subsystem 210 may comprise one or a plurality of microprocessors, ASICs, microcontrollers, programmable logic devices, graphic processing units (GPU), and/or one or a plurality of digital signal processors (DSP).

The memory subsystem 212 comprises one or a plurality of devices for storing data and/or instructions used for the processing subsystem 210 and the networking subsystem 214. For example, the memory subsystem 212 may include a dynamic random access memory (DRAM), a static random access memory (SRAM), and/or other types of memory (sometimes collectively or individually referred to as "computer-readable storage medium"). In some embodiments, the instructions used in the memory subsystem 212 of the processing subsystem 210 comprise: one or a plurality of program modules or sets of instructions (such as program instructions 222 or operating system 224), which can be executed by the processing subsystem 210 to implement various operations described in the present disclosure. It should be noted that one or a plurality of computer programs may constitute a computer program mechanism. In addition, an instruction in the various modules of the memory subsystem 212 may be implemented by the following: advanced programming languages, object-oriented programming languages and/or assembly or machine languages. Moreover, the programming language may be compiled or interpreted, e.g., configurable or configured (used interchangeably in this discussion), to be executed by the processing subsystem 210.

In addition, the memory subsystem 212 may comprise mechanism for controlling access to memory. In some embodiments, the memory subsystem 212 includes a memory hierarchy, and the memory hierarchy includes one or a plurality of caches coupled to the memory in the electronic device 200. In some of these embodiments, one or a plurality of the caches are located in the processing subsystem 210.

In some embodiments, the memory subsystem 212 is coupled to one or a plurality of high-capacity mass storage devices (not shown). For example, the memory subsystem 212 may be coupled to a magnetic or optical driver, a solid state driver, or another type of mass storage device. In these embodiments, the electronic device 200 may use the memory subsystem 212 as a fast-access storage of frequently used data, whereas the mass storage device is used for storing infrequently used data.

The networking subsystem 214 comprises one or a plurality of devices configured to be coupled to a wired and/or wireless network and to communicate over the wired and/or wireless network (i.e., to perform network operations), including: control logic 216, an interface circuit 218, and one or a plurality of antennas 220 (or antenna elements). Although FIG. 2 includes one or a plurality of antennas 220, in some embodiments, the electronic device 200 includes one or a plurality of nodes, such as the node 208, which may be coupled to the one or a plurality of antennas 220. Therefore, the electronic device 200 may include or not include one or a plurality of antennas 220. For example, the networking subsystem 214 may include a networking system based on Wi-Fi, Bluetooth, Bluetooth Low Energy (BLE), RF4CE, ZigBee, Z-Wave, IEEE 802.15.4, MQTT (Message Queue Telemetry Transport), DDS (Data Distribution Service), AMQP (Advanced Message Queuing Protocol), or other short range protocols. Accordingly, the networking subsystem 214 may include a respective wireless network interface. Additionally, the networking subsystem 214 may also include an Ethernet networking system, a cellular networking system (e.g., 3G/4G/2G networks such as UMTS and LTE), a USB networking system, and/or another networking system.

In some embodiments, the pattern shaper (such as a reflector) in one or a plurality of antennas 220 (or antenna elements) is used to adapt or change the transmission antenna radiation pattern of the electronic device 200, and the one or the plurality of antennas 220 are independently and selectively electrically coupled to the ground to guide the transmission antenna radiation pattern in different directions. Therefore, if one or a plurality of antennas 220 include N of antenna radiation pattern shapers, the one or a plurality of antenna 220 may have 2N of different antenna radiation pattern configurations. More generally, a given antenna radiation pattern includes the amplitude and/or phase of a signal specifying the main lobe or the direction of the main lobe of the given antenna radiation pattern, and a so-called "exclusion zone" (sometimes called "notch" or "null value"). Note that the exclusion zone of the given antenna radiation pattern includes a low-intensity region of the given antenna radiation pattern. Although the intensity is not necessarily zero in the exclusion zone, the intensity may be below a threshold such as 4 dB or lower than the peak gain of the given antenna radiation pattern. Therefore, a given antenna radiation pattern may include a local maximum value (e.g., main beam) that points the maximum value to the gain in the direction of the electronic device of interest, and one or a plurality of local minimum values that reduce the gain in the direction of other electronic devices of no-interest. In this way, a given antenna radiation pattern can be selected so that undesirable communication, such as communication with other electronic devices, can be avoided so as to reduce or eliminate adverse effects, such as interference or crosstalk.

The networking subsystem 214 includes a processor, controller, radio device/antenna, socket/plug and/or other devices for coupling to each supported network system, communicating on each supported network system, and processing the data and events for each supported network system. Please note that sometimes the network for coupling to each network system, and the mechanisms used to communicate on that network, and process data and events on that network are collectively referred to as the "network interface" of the network system. For example, the networking subsystem 214 may include one or a plurality of wireless network interface, such as one or a plurality of Wi-Fi interfaces, for establishing and maintaining wireless links with other devices. Furthermore, in some embodiments, the "network" or "connection" between electronic devices does not yet exist. Therefore, the electronic device 200 can use the mechanism in the networking subsystem 214 to perform simple wireless communication between electronic devices, e.g., sending frames and/or scanning frames sent by other electronic devices.

In the electronic device 200, a bus 228 is used to couple the processing subsystem 210, the memory subsystem 212, and the networking subsystem 214 together. Bus 228 may comprise electro, optic and/or electro-optic connections where subsystems can be used to communicate commands and data, and so on. Although only one bus 228 is shown for clarity, different embodiments may comprise different numbers or configurations of electrical, optical, and/or electro-optical connections in the subsystems.

In some embodiments, the electronic device 200 includes a display subsystem 226 for showing information on a display device, which may include a display driver and a display, e.g., a liquid crystal display, a multi-touch screen, etc.

Although specific components are used to describe the electronic device 200, in an alternative embodiment, there may be different components and/or subsystems in the electronic device 200. For example, the electronic device 200 may include one or a plurality of additional processing subsystems, memory subsystems, networking subsystems, and/or display subsystems. In addition, one or a plurality of the subsystems may not exist in the electronic device 200. Moreover, in some embodiments, the electronic device 200 may include one or a plurality of additional subsystems not shown in FIG. 2. In addition, although separate subsystems are shown in FIG. 2, in some embodiments, some or all of the given subsystems or components may be integrated into one or a plurality of the other subsystems or components in the electronic device 200. For example, in some embodiments, the program instruction 222 is comprised in the operating system 224, and/or the control logic 216 is comprised in the interface circuit 218.

Moreover, any combination of analog and/or digital circuits may be used to implement the circuits and components in the electronic device 200, including: bipolar, PMOS and/or NMOS gates or transistors. In addition, the signals in these embodiments may include digital signals with approximate discrete values and/or analog signals with continuous values. In addition, the components and circuits may be single-ended or differential, and power supplies may be unipolar or bipolar.

An integrated circuit (sometimes referred to as a "communication circuit" or "device for communication") can implement some or all of the functions of the networking subsystem 214. The integrated circuit may include hardware and/or software mechanisms, and is used to transmit wireless signals from the electronic device 200 and receive signals at the electronic device 200 from other electronic devices. In addition to the mechanisms described herein, radio devices are generally known in the art, and therefore will not be elaborated. Generally, the networking subsystem 214 and/or the integrated circuit may include any number of radio devices. Note that the radio devices in the multiple radios embodiment function in a similar manner to the single radio embodiment described.

In some embodiments, the networking subsystem 214 and/or the integrated circuit includes a configuration mechanism (such as one or a plurality of hardware and/or software mechanisms) that configures the radio to perform transmission and/or reception on a given communication channel (e.g., a given carrier frequency). For example, in some embodiments, the configuration mechanism may be used to switch the radio from monitoring and/or transmitting on a given communication channel to monitoring and/or transmitting on a different communication channel. Please note that "monitoring" as used herein includes receiving signals from other electronic devices and possibly performing one or a plurality of processing operations on the received signals.

Although the foregoing discussion uses Wi-Fi and/or Ethernet communication protocols as illustrative examples, in other embodiments, various communication protocols may additionally be used. Therefore, communication technologies can be used in various network interfaces. In addition, although some operations in the aforementioned embodiments are implemented by hardware or software, in general, the operations in the aforementioned embodiments may be implemented in various configurations and frameworks. Therefore, some or all of the operations in the aforementioned embodiments may be executed by hardware, software, or both. For example, at least some operations in the communication technology can be implemented using the program instruction 222, the operating system 224 (e.g., a driver for the interface circuit 218), or firmware in the interface circuit 218. Alternatively or in addition, at least some operations in the communication technology may be implemented at physical layer, e.g., hardware in the interface circuit 218.

Figure 3:
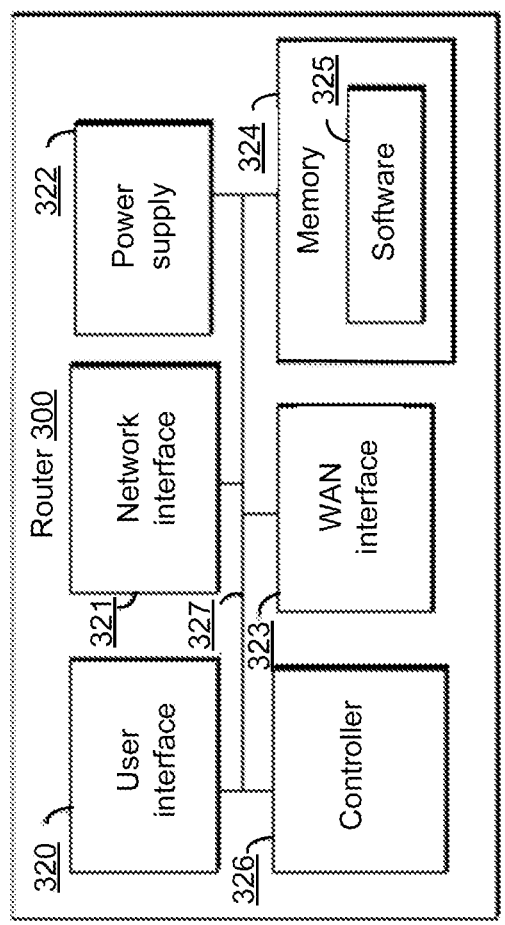
FIG. 3 shows an exemplary block diagram of a router according to an embodiment of the present disclosure.

FIG. 3 shows an exemplary block diagram of a router 300 according to an embodiment of the present disclosure. The router 300 may be a further exemplary embodiment of the electronic device 110 and the extender node 120 described in FIG. 1.

Although referred to herein as a router, the router 300 can be, e.g., a hardware electronic device capable of combining functions of a modem, an access point, and/or a router. It is also conceivable that the router 300 may include, but is not limited to, the functions of an IP/QAM set-top box (STB) or a smart media device (SMD), which can decode audio/video content and play the content provided by OTT or MSO.

As shown in FIG. 3, the router 300 includes a user interface 320, a network interface 321, a power supply 322, a WAN interface 323, a memory 324 and a controller 326. The user interface 320 includes, but is not limited to, buttons, keyboards, keypads, LCD, CRT, TFT, LED, HD, or other similar display devices, including display devices with touch screen capability to enable interaction between users and gateway devices. The network interface 321 may include various network cards and circuitries implemented in software and/or hardware, so as to be able to communicate with wireless expander devices and clients using wireless protocols, such as IEEE 802.11 Wi-Fi protocol.

The power supply 322 supplies power to the internal components of the router 300 through the internal bus 327. The power supply 322 may be self-contained power supply, e.g., a battery pack; its interface is charged by a charger connected (e.g., directly or via another device) to a socket. The power source 322 may further include a rechargeable battery that is detachable for replacement, e.g., NiCd, NiMH, Li-ion, or Li-pol battery. The WAN interface 323 may include various network cards and circuitries implemented in software and/or hardware. Specifically, the WAN interface 323 may at least include one or a plurality of wireless network interface (not shown), such as one or a plurality of Wi-Fi interfaces. The power supply 322 may be controlled to individually power off and power on the wireless network interface. When the wireless network interface is powered on, the router 300 may establish and/or maintain a wireless link with other devices. When the wireless network interface is powered off, the router 300 cannot establish a wireless link with other devices, and the existing wireless link will be interrupted.

The memory unit 324 comprises a single memory unit or one or a plurality of memory units or memory positions, including but not limited to the random access memory (RAM), dynamic random access memory (DRAM), static random access memory (SRAM), read only memory (ROM), EPROM, EEPROM, flash memory, FPGA logic block, hard drive, or any other layers of a memory hierarchy. The memory 324 may be used to store any type of instructions, software or algorithms, including software 325 for controlling the general functions and operations of the router 300.

The controller 326 controls the general operation of the router 300 and performs management functions related to other devices in the network (such as expanders and clients). The controller 326 may include, but is not limited to, a CPU, a hardware microprocessor, a hardware processor, a multi-core processor, a single-core processor, a microcontroller, an application specific integrated circuit (ASIC), a DSP or other similar processing device, and any type of instructions, algorithms or software capable of performing operations and functions according to embodiments described in the present disclosure. The controller 326 can be of various types of implementations of digital circuit systems, analog circuit systems, or mixed signal (a combination of analog and digital signals) circuit systems executing functions in a computer system. The controller 326 may comprise, e.g., an integrated circuit (IC), a portion or circuit of a separate processor core, an entire processor core, a separate processor, a programmable hardware device, such as a field programmable gate array (FPGA), and/or a system comprising a plurality of processors.

The internal bus 327 is used to establish communication between components (such as 320-322, 324 and 326) of the router 300.

It should be noted that although the exemplary embodiments of both the electronic device 110 and the extender node 120 of FIG. 1 have been described above in conjunction with the electronic device 200 and the router 300, this does not mean that the electronic device 110 and the extender node 120 will necessarily be implemented as the same device. It should be understood that both the electronic device 110 and the extender node 120 can adopt the exemplary architecture of the electronic device 200 or the router 300, and are configured as devices different from each other.

Figure 4:
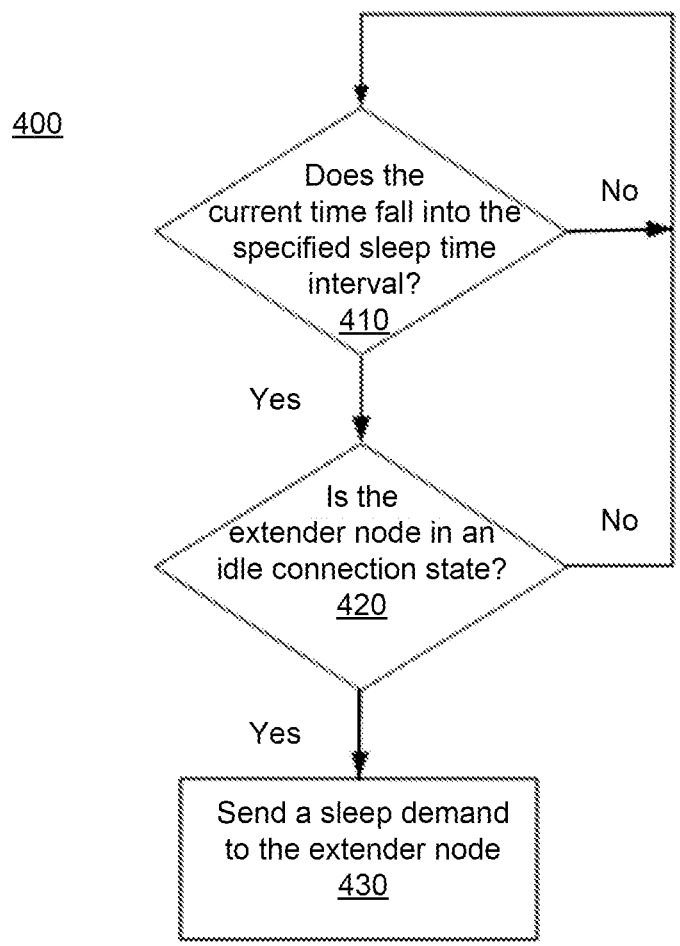
FIG. 4 shows an exemplary flowchart of the method of making an extender node sleep according to the present disclosure.

FIG. 4 shows an exemplary flowchart of a method 400 for making an extender node sleep according to the present disclosure. The method 400 will be described below in connection with the network system 100 of FIG. 1. The method 400 may be performed by the electronic device 110 in the network system 100. Moreover, the extender node described in FIG. 4 may be the extender node 120 in the network system 100.

The method 400 may start from step 410. In step 410, it may be determined whether the current time falls within a specified sleep time interval. The designated sleep time interval may be a time interval associated with a low traffic period of the extender node 120. In the specified sleep time interval, the extender node 120 may be connected to fewer clients 130 and/or only need to transmit less traffic.

In response to determining that the current time falls within the specified sleep time interval, the method 400 may continue to step 420. In step 420, the electronic device 110 may determine whether the extender node 120 is in an idle connection state. The idle connection state may include the extender node 120 being not connected to any client 130, or the extender node 120 being only connected to a sleeping client. The extender node 120 in the idle connection state generally does not need to transmit traffic to the clients, or only needs to transmit a very small amount of traffic to the clients.

In response to determining that the extender node 120 is in an idle connection state, the method 400 may continue to step 430. In step 430, the electronic device 110 may send a sleep command to the extender node 120, instructing the extender node 120 to power off the wireless network interface of the extender node. When the wireless network interface is powered off, the extender node 120 will enter a sleep state with low power consumption, thus keeping low power consumption. A wireless network interface being power-off herein may mean turning off the front haul wireless interface but leaving the back haul wireless interface on. Preferably, a wireless network interface being power-off herein may mean that no power is supplied to the wireless network interface of the extender node 120, so that it is completely turned off. Compared with other energy-saving methods that only reduce the signaling overhead on the wireless link without disconnecting the wireless link, powering off the wireless network interface will achieve the greatest power saving.

According to embodiments of the present disclosure, the electronic device 110 can obtain the current time in various ways. For example, the electronic device 110 may maintain a local clock and read the current time from the local clock. Additionally or alternatively, the electronic device 110 may receive an indication about the current time from the external network 600.

According to the embodiments of the present disclosure, the sleep time interval can be specified for the extender node 120 in various ways. In one example, the sleep time interval may be a default time interval designated by the manufacturer of the electronic device 110 or the extender node 120, e.g., 00:00-06:00 every day. In another example, the sleep time interval may be specified by the user of the network system 100. In another example, the electronic device 110 may specify a different sleep time interval for each extender node 120. For example, different production equipment sharing a factory network may have different production shifts, so different sleep time intervals can be specified for different extender nodes 120 serving production equipment with different shifts. The electronic device 110 can identify the low traffic period of each extender node 120 by analyzing the historical traffic data thereof, and specify the sleep time interval of the extender node 120 based on the identified low traffic period. The electronic device 110 can dynamically update the sleep time interval designated for each extender node 120 and push the new sleep time interval to the clients 130 of each extender node 120.

According to an embodiment of the present disclosure, the electronic device 110 may determine whether an extender node 120 is in an idle connection state based on the topology information of the network system 100. For example, the electronic device 110 can maintain the topology information of the network system 100. The topology information may include information associated with one or a plurality of extender nodes 120 connected to the electronic device 110, and may include information associated with one or a plurality of clients 130 connected to each extender node 120. For example, the electronic device 110 may maintain a client table. The client table may indicate an extender node 120 (e.g., extender node 120-1) to which a specific client (e.g., client 130-1) is connected, connection establishment time, connection disconnection time, IP address used, traffic data analysis, and so on. The electronic device 110 can update the topology information of the network system 100 by polling each extender node 120.

According to an embodiment of the present disclosure, the electronic device 110 may determine whether the extender node 120 is not connected to any client 130 based on the topology information (e.g., client table) of the network system 100. For example, the electronic device 110 may determine the number of clients 130 connected to a specific extender node 120 (e.g., the extender node 120-1) based on the client table. In response to determining that the number of clients 130 connected to the specific extender node 120 is zero, it can be determined that the extender node 120 is in an idle connection state.

According to an embodiment of the present disclosure, if the extender node 120 is connected to one or a plurality of clients 130, the electronic device 110 can identify whether each client 130 of the one or a plurality of clients is a sleeping client. If all clients connected to the extender node 120 are sleeping clients, it can be determined that the extender node 120 is in an idle connection state. Otherwise, it can be determined that the extender node 120 is not in the idle connection state.

According to the embodiment of the present disclosure, it can be identified whether the client is a sleeping client based on the traffic pattern of each client. For example, if the traffic of a client within a specified length of time is lower than a predetermined threshold, the client can be identified as a sleeping client. Although the sleeping client may still have a small amount of traffic, it is likely that such traffic is unimportant background traffic, so it can be discarded. "Traffic below the predetermined threshold" may include the flow rate being lower than the predetermined rate threshold within a specified time length, and/or the total net flow within a specified time length being lower than the predetermined flow threshold.

In the above embodiments, the electronic device 110 may set different specified time lengths and/or predetermined thresholds for different types of clients 130. Specifically, the electronic device 110 may identify the type of the client 130 connected to the extender node 120, and determine at least one of a predetermined threshold and a specified time length for the client based on the identified type. Since different types of clients 130 generally have different traffic patterns, it is advantageous to adaptively set a specified length of time and/or a traffic threshold for each client. For example, for a streaming media device (such as a smart TV), a larger predetermined threshold value and/or a smaller specified time length can be set. For a text reader device (e.g., an electronic reader), a smaller predetermined threshold value and/or a longer specified time length can be set. For security monitoring devices (such as surveillance cameras and security sensors), the predetermined threshold can be set to zero, which means that these security monitoring devices will never be considered as sleeping clients. In this case, the wireless network interface of the extender node 120 serving the security monitoring devices will not be powered off, which ensures that the security monitoring devices can access the wireless communication network continuously and stably through the extender node 120.

According to an optional embodiment of the present disclosure, if a specific key client is not connected to the extender node 120, the extender node 120 may be considered to be in an idle connection state, and thus enter a sleep state. Specifically, one or a plurality of specific clients (e.g., smart phones of users and controllers of smart home systems) can be identified as key clients of the network system 100. If the electronic device 110 recognizes that the extender node 120 is not connected to any of the specific one or a plurality of clients, it can determine that the extender node 120 is in an idle connection state and send a sleep command to it. Accordingly, the extender node will no longer provide the wireless communication network. This setting is advantageous in some scenarios. For example, some scenarios require access to key clients to maintain network security.

According to an optional embodiment of the present disclosure, the electronic device 110 may also enter a sleep state. The electronic device 110 can execute its own sleep policy. In response to determining that the electronic device 110 is about to enter a sleep state, the electronic device 110 may send a sleep command to each extender node 120 in the network system 100.

Figure 5:
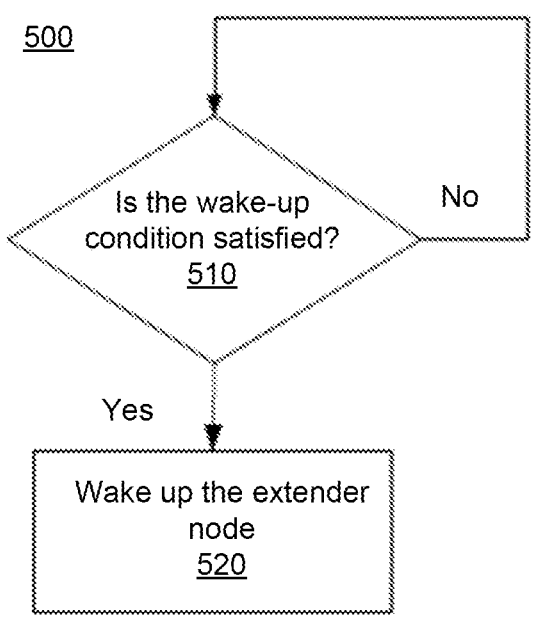
FIG. 5 shows an exemplary flowchart of the method of making the extender node wake up according to the present disclosure.

FIG. 5 shows an exemplary flowchart of a method 500 for waking up an extender node according to the present disclosure. The method 500 will be described below in connection with the network system 100 of FIG. 1. The method 500 may be performed by the electronic device 110 and the extender node 120 in the network system 100, e.g.

The method 500 may start from step 510. In step 510, for the sleeping extender node 120, it may be determined whether the wake-up condition is satisfied. According to embodiments of the present disclosure, various wake-up conditions can be set, including but not limited to: (i) when the specified sleep interval expires; (ii) when the timer set by the extender node 120 expires; or (iii) when the user has conducted any physical operation on the extender node 120. In response to any one of the wake-up conditions being met, the method 500 may continue to step 520. In step 520, the sleeping extender node 120 may be awakened.

According to an embodiment of the present disclosure, when the extender node 120 is connected to the electronic device 110 through a wired link (e.g., Ethernet backhaul and MoCA backhaul), the wired link will not be interrupted due to the closing of the wireless network interface of the extender node 120. Therefore, the sleeping extender node 120 can be awakened by the electronic device 110. For example, the electronic device 110 may monitor whether a designated sleep time interval for the extender node 120 expires. In response to the expiration of the specified sleep time interval, the electronic device 110 may send a wake-up command to the extender node 120 through the wired link between the extender node 120 and the electronic device 110 to wake up the extender node 120.

According to an embodiment of the present disclosure, when the extender node 120 is connected to the electronic device 110 through a wireless link, the wireless link will be interrupted when the wireless network interface of the extender node 120 is turned off. Therefore, the extender node 120 cannot wake up depending on the electronic device 110, but should wake up autonomously. In this case, the sleep command sent by the electronic device 110 to the extender node 120 in step 430 may additionally instruct the extender node 120 to start the timer while turning off the wireless network interface. The extender node 120 can autonomously wake up when the timer expires without receiving a wake-up command from the electronic device 110.

According to the embodiment of the present disclosure, the extender node 120 can be autonomously woken up in response to the physical operation of the sleeping extender node 120 by the user. For example, when the user presses any physical button on the extender node 120, the extender node 120 can be awakened. Alternatively, when the user unplugs and plugs in the power supply on the extender node 120, the extender node 120 may be awakened. This way allows the user to wake up the extender node 120 manually.

According to the embodiment of the present disclosure, the electronic device 110 may update the sleep time interval of the extender node according to the history of manual awakening of the extender node 120. For example, if the number of times the extender node 120 is manually woken up in a period of time (e.g., one month or more) exceeds a specified threshold, the electronic device 110 may consider that the original sleep time interval does not conform to the user's usage habits. Accordingly, the electronic device 110 can update the sleep time interval of the extender node 120. For example, the electronic device 110 may modify the expiration time of the sleep time interval to a time point associated with the time point when the user manually wakes up the extender node 120.

According to an embodiment of the present disclosure, waking up the extender node 120 may include powering on the wireless network interface of the extender node 120 again. It may take a certain time for the wireless network interface to power on, during which the extender node 120 may be in a transitional state from the sleep state to the normal state. The wireless network interface after being re-powered allows the extender node 120 to re-establish or restore the wireless link with other devices (e.g., the electronic device 110 or the client 130). Accordingly, the extender node 120 can operate as a wireless access point again.

According to an embodiment of the present disclosure, waking-up of the extender node 120 may further include restoring the wireless link between the extender node 120 and the electronic device 110. Before the wireless network interface of the extender node 120 is powered off, the extender node 120 may save wireless link information associated with the wireless link between the extender node 120 and the electronic device 110. In the wake-up process, the extender node 120 may try to restore the wireless link based on the saved wireless link information. In this way, the original wireless link between the extender node 120 and the electronic device 110 can be quickly restored without going through a complicated process of establishing a new wireless link.

According to the embodiments of the present disclosure, the main access point in the wireless communication network can be utilized to monitor the status of each extender node and instruct the extender node to power off its wireless network interface when the sleep condition is satisfied, thereby reducing the power consumption of the extender node. A sleeping extender node may be woken up in response to a wake-up condition. Sleep and wake-up of extender nodes can be automatically performed without being perceived by users, so it will not significantly affect the performance of the network.

The present disclosure may be implemented as any combination of devices, systems, integrated circuits, and computer programs on non-transitory computer-readable media. One or a plurality of processors may be implemented as an integrated circuit (IC), an application specific integrated circuit (ASIC) or a large-scale integrated circuit (LSI), a system LSI, a super LSI, or an ultra LSI component that performs some or all of the functions described in the present disclosure.

The present disclosure includes the use of software, applications, computer programs, or algorithms. Software, application programs, computer programs or algorithms can be stored on a non-transitory computer readable medium, so that a computer with one or a plurality of processors can execute said steps and the steps described in the drawings. For example, one or a plurality of memories store software or algorithms in executable instructions, and one or a plurality of processors associate a set of instructions for executing the software or algorithms to provide reliable management of gateways in an MSO network according to embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, device or apparatus used to be executed on hardware to provide machine instructions or data to a programmable data processor, such as magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In one or a plurality of embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the aforementioned features, other features or modifications can be expected. It can be expected that any emerging technology that may replace any of the aforementioned implementation technologies may be used to complete the implementation of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

Similarly, although operations are depicted in a specific order in the Attached Drawings, this should not be understood as a requirement that such operations should be executed in the specific order shown or in the sequential order, or that all illustrated operations be executed to achieve the desired result. In some cases, multi-tasking and parallel processing can be advantageous.

The invention claimed is:

1. An electronic device that provides a wireless communication network to one or more clients via one or a plurality of extender nodes in a network, wherein the electronic device comprises:
   a processor, and
   a computer readable storage medium containing executable instructions that, when executed by the processor, cause the electronic device to be configured to:
      identify a type of a client associated with the one or more clients, from a plurality of different types of clients, connected to a first extender node;
      read a current time from a local clock;
      determine whether the current time falls within a specified sleep time interval for a first extender node of the one or the plurality of extender nodes, wherein the electronic device is an access point that provides the plurality of extender nodes access to an external network, wherein the specified sleep time interval is selected by the electronic device based on the type, and wherein each of the plurality of different types correspond to a different specified sleep time interval and a different traffic threshold;
      in response to determining that the current time falls within the specified sleep time interval, determine whether the first extender node is in an idle connection state, wherein the idle connection state includes the first extender node being not connected to any of the one or more clients or the first extender node being only connected to a sleeping client of the one or more clients; and
      based at least in part on the idle connection state of the first extender node, sending a sleep command to the first extender node, wherein the sleep command instructs the first extender node to power off a wireless network interface for the wireless communication network of the first extender node.

2. The electronic device according to claim 1, wherein the electronic device is configured to:
   identify a client of the one or more clients as the sleeping client in response to determining that traffic of the client within a specified time length is lower than a corresponding traffic threshold.

3. The electronic device according to claim 1, wherein the electronic device is connected to the first extender node through a wired link, and the electronic device is further configured to:
   in response to the expiration of the specified sleep time interval, send a wake-up command to the first extender node through the wired link to wake up the first extender node.

4. The electronic device according to claim 1, wherein the electronic device is connected to the first extender node through a wireless link, and the sleep command sent by the electronic device further instructs the first extender node to start a timer so that the first extender node wakes up autonomously when the timer expires.

5. The electronic device according to claim 4, wherein waking-up includes restoring the wireless link between the first extender node and the electronic device based on the wireless link information saved by the first extender node.

6. The electronic device according to claim 1, wherein the first extender node is configured to autonomously wake up in response to a user's physical operation on the first extender node.

7. The electronic device according to claim 3, wherein waking up the first extender node includes powering on the wireless network interface of the first extender node again.

8. The electronic device according to claim 1, wherein the electronic device is further configured to:
   transmit a sleep command to each of the one or the plurality of extender nodes in response to determining that the electronic device is about to enter a sleep state.

9. A method of an electronic device for managing one or a plurality of extender nodes in a network, the method comprising:
- identify a type of a client associated with the one or more clients, from a plurality of different types of clients, connected to a first extender node;
- read a current time from a local clock;
- determining whether the current time falls within the specified sleep time interval for a first extender node of the one or the plurality of extender nodes, wherein the electronic device of the network provides a wireless communication network to one or more clients via the one or the plurality of extender nodes, and wherein the electronic device is an access point that provides the plurality of extender nodes access to an external network, wherein the specified sleep time interval is selected by the electronic device based on the type, and wherein each of the plurality of different types correspond to a different specified sleep time interval and a different traffic threshold;
- in response to determining that the current time falls within the specified sleep time interval, determining whether the first extender node is in an idle connection state, wherein the idle connection state includes the first extender node being not connected to any of the one or more clients or the first extender node being only connected to a sleeping client of the one or more clients; and
- in response to determining that the first extender node is in the idle connection state, sending a sleep command to the first extender node, instructing the first extender node to power off a wireless network interface for the wireless communication network of the first extender node.

10. The method according to claim 9, further comprising:
- identifying a client of the one or more clients as the sleeping client in response to determining that traffic of the client within a specified time length is lower than a corresponding traffic threshold.

11. The method according to claim 9, wherein the electronic device is connected to the first extender node through a wired link, and the method further comprises:
- in response to the expiration of the specified sleep time interval, sending a wake-up command to the first extender node through the wired link to wake up the first extender node.

12. The method according to claim 9, wherein the electronic device is connected to the first extender node through a wireless link, and the sleep command sent further instructs the first extender node to start a timer so that the first extender node wakes up autonomously when the timer expires.

13. The method according to claim 12, wherein waking-up includes restoring the wireless link between the first extender node and the electronic device based on the wireless link information saved by the first extender node.

14. The method according to claim 9, wherein the first extender node wakes up autonomously in response to a user's physical operation on the first extender node.

15. The method according to claim 9, wherein the method further comprises:
- in response to determining that the electronic device is about to enter a sleep state, sending a sleep command to each of the one or the plurality of extender nodes.

16. A non-transitory computer readable medium of an electronic device storing one or more instructions thereon, the one or more instructions, when executed by a processor of the electronic device, cause the electronic device to perform one or more operations comprising:
- identify a type of a client associated with the one or more clients, from a plurality of different types of clients, connected to a first extender node;
- read a current time from a local clock;
- determining whether the current time falls within the specified sleep time interval for a first extender node of the one or the plurality of extender nodes, and wherein the electronic device is an access point that provides the plurality of extender nodes access to an external network, wherein the specified sleep time interval is selected by the electronic device based on the type, and wherein each of the plurality of different types correspond to a different specified sleep time interval and a different traffic threshold;
- in response to determining that the current time falls within the specified sleep time interval, determining whether the first extender node is in an idle connection state, wherein the idle connection state includes the first extender node being not connected to any of the one or more clients or the first extender node being only connected to a sleeping client of the one or more clients; and
- in response to determining that the first extender node is in the idle connection state, sending, by the electronic device, a sleep command to the first extender node, instructing the first extender node to power off a wireless network interface for the wireless communication network of the first extender node.

17. The non-transitory computer-readable medium of claim 16, wherein the one or more instructions cause the processor to perform one or more further operations comprising:
- in response to determining that the electronic device is about to enter a sleep state, sending a sleep command to each of the one or the plurality of extender nodes.

* * * * *